United States Patent [19]

Goutmann et al.

[11] 4,271,502
[45] Jun. 2, 1981

[54] DIGITAL VOICE CONFERENCER

[75] Inventors: Michel M. H. Goutmann, Fort Washington; Robert C. Harper, Oreland, both of Pa.

[73] Assignee: Magnavox Government and Industrial Electronics Co., Fort Wayne, Ind.

[21] Appl. No.: 50,030

[22] Filed: Jun. 19, 1979

[51] Int. Cl.³ ............................................. H04M 3/56
[52] U.S. Cl. ....................................................... 370/62
[58] Field of Search ....................... 179/18 BC, 1 CN; 370/62

[56] References Cited

U.S. PATENT DOCUMENTS

| 3,882,280 | 5/1975 | Goutmann | 179/18 BC X |
| 3,883,697 | 5/1975 | Brown | 179/18 BC |
| 3,937,898 | 2/1976 | Presto et al. | 179/18 BC |
| 4,112,258 | 9/1978 | Alles | 179/15 AT |
| 4,126,766 | 11/1978 | McLaughlin et al. | 179/18 BC |

Primary Examiner—Thomas W. Brown
Attorney, Agent, or Firm—William J. Iseman; William J. Streeter; Thomas A. Briody

[57] ABSTRACT

A digital voice conferencer for providing digitally encoded vocal communication among a plurality of remotely located digital voice terminals. The conferencer buffers and synchronizes the incoming digital signals generated by each of the terminals and periodically selects a primary speaker signal on a predetermined priority basis. The conferencer distributes the primary speaker signal to the remaining terminals and the primary speaker terminal is sent either an idle or interrupter signal. The idle signal causes the primary speaker to hear silence and the interrupter signal causes the primary speaker to hear voice information from a selected terminal other than that of the primary speaker.

5 Claims, 10 Drawing Figures

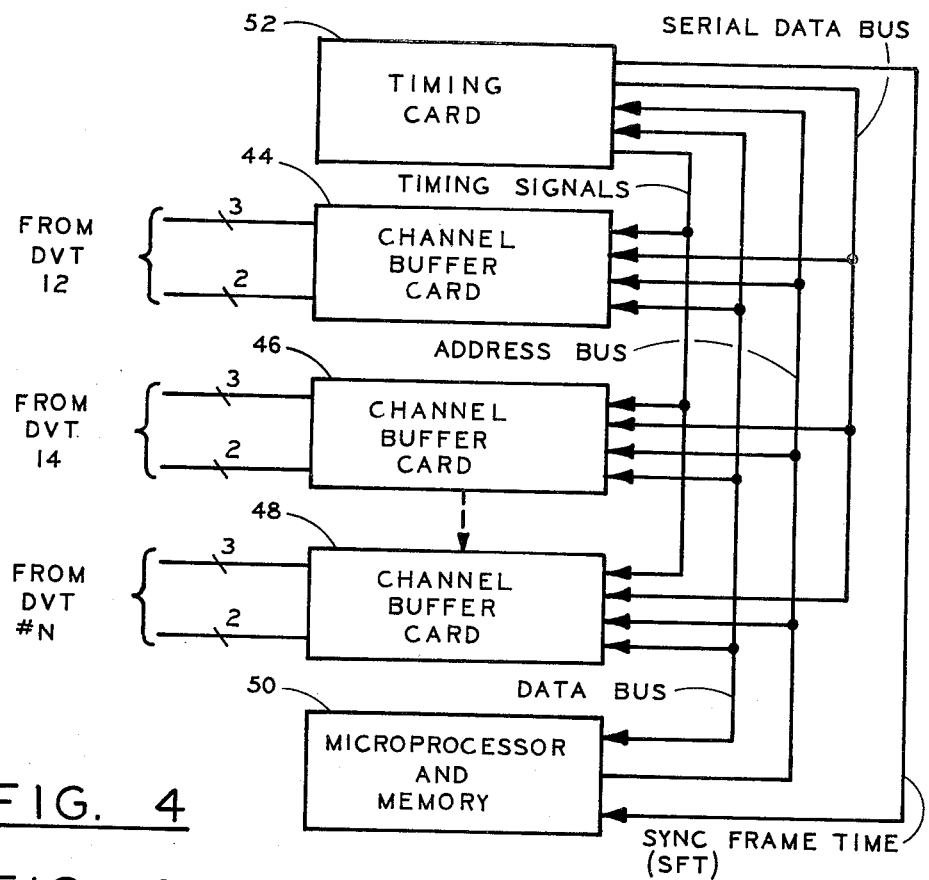
FIG. 4
FIG. 6
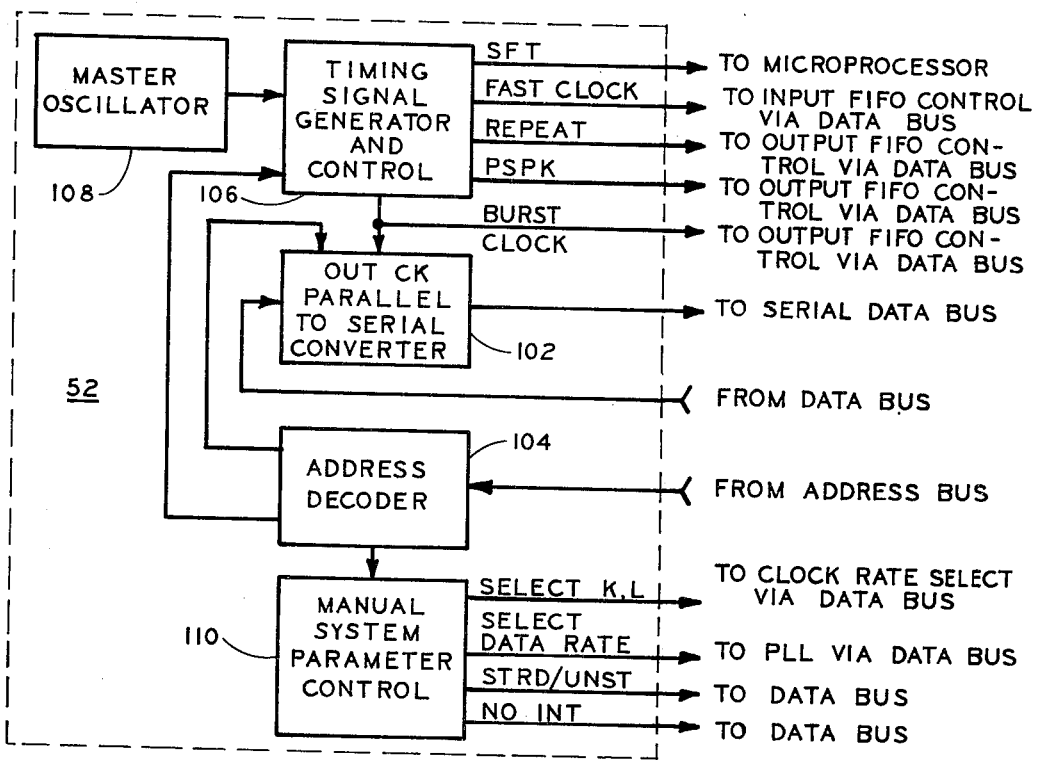

DIGITAL VOICE CONFERENCER

BACKGROUND OF THE INVENTION

This invention relates generally to voice conferencing devices and, more particularly, is concerned with a digital voice conferencer (DVC) which provides digitally encoded vocal communication among a plurality of remotely located digital voice terminals which typically achieve bit rates between 2.4 to 32 kilobits per second. Examples of voice digitizers that can be utilized in conjunction with the conferencer of the present invention include linear predictive coders (LPC), vocoders, adaptive differential pulse modulators (ADPCM) and delta modulators such as continuously variable slope delta modulators (CVSD). The LPC, vocoders and ADPCM digitizers all generate a predetermined length of data sequences and are typically characterized as "framed" digitizers. The delta modulators generate no such predetermined data sequence length and are accordingly characterized as "unframed" digitizers.

Former digital voice conferencing techniques involving more than two people using such voice digitizers involved the individual conversion of the transmitted digital sequences from each terminal back to an analog form at some central conferencing location. The set of resultant analog waveforms were then converted into a single analog waveform either by a voice-actuated switch or by a waveform summing process. The single resulting analog waveform is then re-digitized by a voice digitizer and redistributed to each of the conferees. This process of first converting to analog, then re-digitizing, considerably degrades the quality of the conference. Such operations and conversions are avoided in the structure and function of the present invention, thereby providing a corresponding improvement in conferencing quality.

SUMMARY OF THE INVENTION

Accordingly, it is an object of the present invention to provide a digital voice conferencer which permits digitally encoded vocal communication among a plurality of remotely located digital voice terminals. Another object of the invention is to provide a digital voice conferencer which is capable of operating with differing types of voice terminals and which typically operates at data bit rates between 2400 and 32,000 bits per second. Yet another object of the present invention is to provide a digital voice conferencer which is easily adaptable to operation among a variety of digital voice conference terminals having different bit time frame sequencing. Still a further object of the present invention is to provide a digital voice conferencer which does not involve utilization of analog conversion circuits and which consequently provides relatively high-quality conferenced communications.

Briefly, these and other objects are accomplished by a digital voice conferencer which provides digitally encoded vocal communication among a plurality of remotely located digital voice terminals which typically operate at data bit rates between 2400 and 32,000 bits per second. The conferencer buffers and synchronizes the incoming digital signals generated by each of the terminals and periodically selects a primary speaker signal on a predetermined priority basis. The conferencer distributes the primary speaker signal to the remaining terminals and the primary speaker terminal is sent either an idle or interrupter signal. The idle signal causes the primary speaker to hear silence and the interrupter signal causes the primary speaker to hear voice information from a selected terminal other than that of the primary speaker. For a better understanding of these and other aspects of the invention, reference may be made to the following detailed description taken in conjunction with the accompanying drawings.

BRIEF DESCRIPTION OF THE DRAWINGS

FIG. 4 is a simplified block diagram which illustrates the major structural components of the present invention.

FIG. 6 is a block diagram of timing card circuitry as used in accordance with the present invention.

DESCRIPTION OF THE PREFERRED EMBODIMENT

Figure 1:
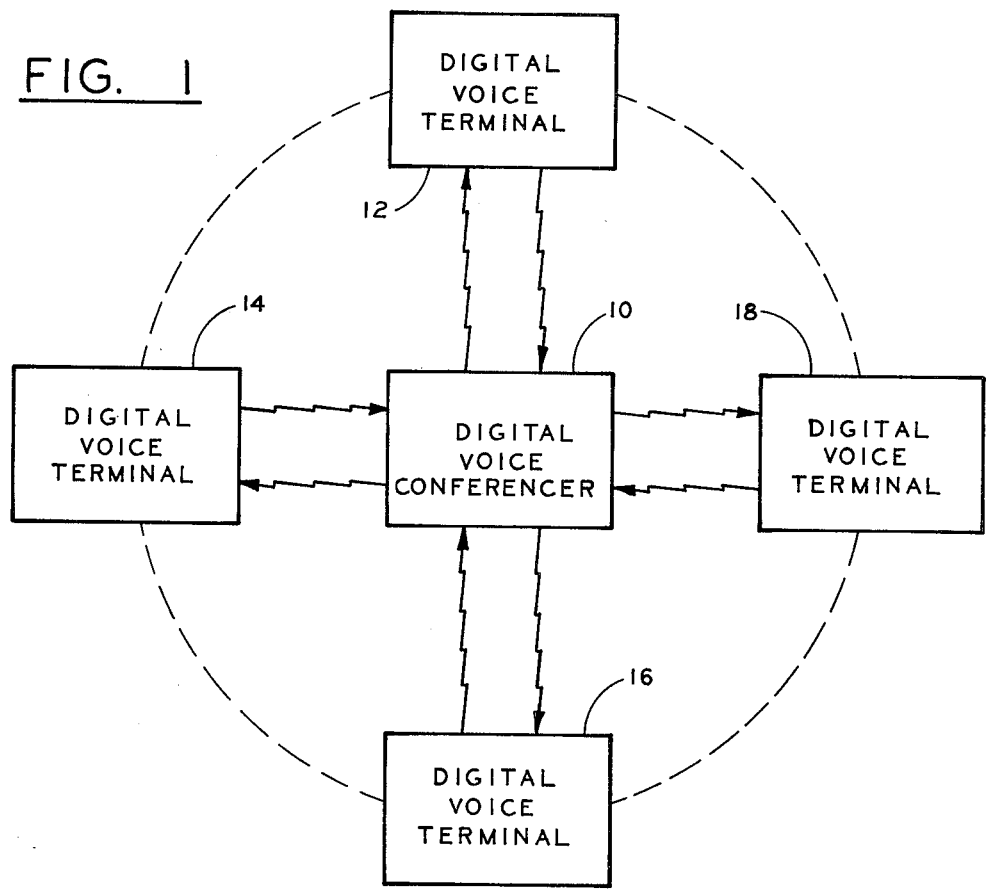
FIG. 1 is a block diagram of a voice conferencing system which utilizes the present invention.

FIG. 1 illustrates a functional schematic block diagram of how the digital voice conferencer 10 is typically used in a conferencing process among a number of digital voice terminals (DVT) 12, 14, 16 and 18 and which are each connected to the conferencer 10 through a full duplex communication channel which carries the digitized voice signal. The communication channels link the remote terminals 12-18 to the conferencer 10 through any number of a variety of conventional means such as hard wire, radio, microwave or optic transmissions. The conferencer 10 accepts the digital sequences from each of the terminals and performs a "frame alignment" process on each of the accepted sequences. Although FIG. 1 illustrates the utilization of four terminals with the conferencer, it will be appreciated that the conferencer may be used with a lesser or greater number of digital voice terminals and the selection of which is dependent only upon conference requirements and corresponding structural and firmware implementation. In the preferred embodiment, the maximum number of terminals is ten. For reasons described hereinafter, the frame alignment process is important in view of the fact that the digital sequences accepted by the conferencer from individual framed terminals will generally not share common frame boundaries when they arrive at the conferencer 10. The conferencer 10 of the present invention is capable of functioning in turn with a variety of differing voice terminals each having differing frame format. By "frame format" is meant the sequencing and number of digital bits which are utilized by each of the voice terminals in processing and encoding the voice information. For example, one model of voice terminal such as an HY-2 as manufactured by Philco-Ford Corporation may process on a frame format basis of fifty-four bits and another voice terminal may be designed to process on a forty-nine bit frame format basis. Although the conferencer 10 of the present invention is adaptable for use with a variety of differing frame formats, it should be noted that in any single conference system, all of the voice terminals within the same system must have identical frame formats. The conferencer 10 decides, on a frame-by-frame basis, which one of the digital sequences from among all those that it has received should be sent back to the digital voice terminals 12–18. The terminal whose sequence is selected for distribution in this fashion is referred to as the "primary speaker" (PS). The conferencer 10 does not send the primary speaker his own sequence in return, since this could cause an awkward echo condition. Instead, by means of a conferencer control described hereinafter, what is returned to the primary speaker is either a digitally encoded idle sequence which causes the primary speaker to hear silence, or else a digitally encoded "interrupter" sequence (INT) selected by the conferencer 10 from some voice terminal other than that of the primary speaker.

When operating with framed voice terminals, performing the frame alignment process on all the incoming digital sequences means that each digital voice terminal to which the primary speaker or interrupter is being distributed does not have to re-adjust its frame synchronization circuits when the primary speaker or interrupter changes from one terminal to another. This is important because the time required for a terminal to re-adjust its frame synchronization is generally long enough to destroy the capability to hold a conference in the indicated manner. The frame alignment capability of the conferencer is an integral and important part of the invention structure and function.

In addition to having performed frame alignment, a second integral part of the conferencer invention concerns the desirability of obtaining a high-quality conference process involving many digital voice terminals which is achieved by selecting and distributing a primary speaker and interrupter data sequence on a frame-by-frame basis.

Figure 2:
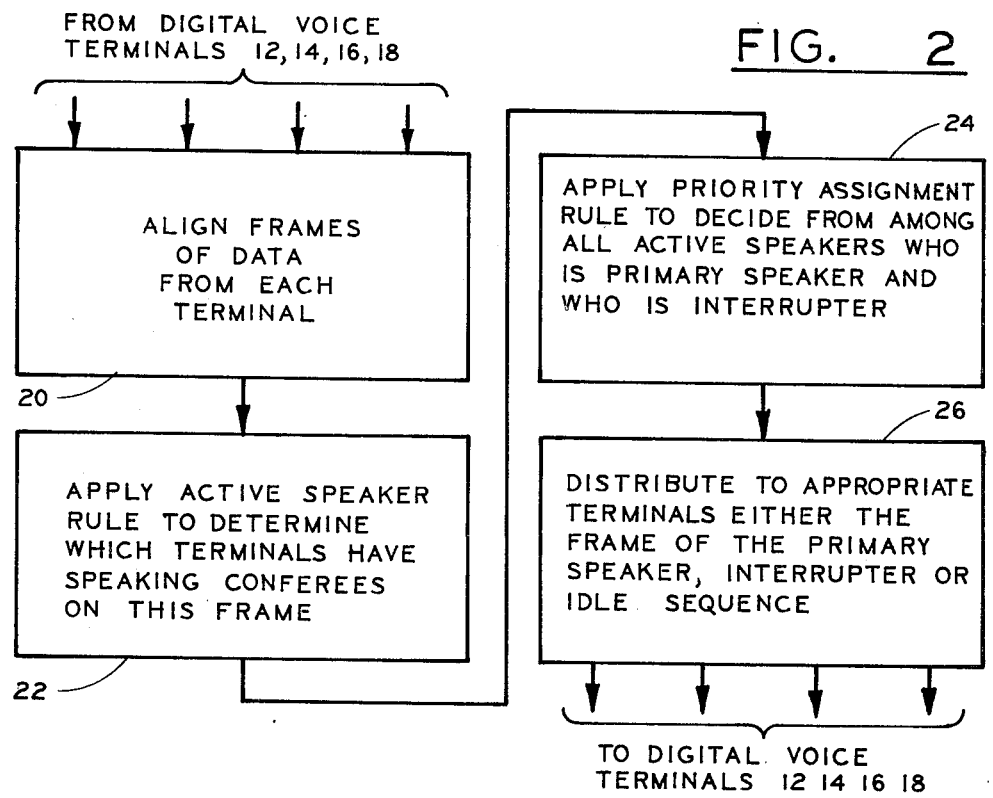
FIG. 2 is a simple flow chart of operational steps performed in accordance with the present invention.

FIG. 2 illustrates by means of a simple flow chart the sequence of operations performed by the conferencer on a frame-by-frame basis to determine who is primary speaker and interrupter on any given frame. It may be convenient to note at this time that a typical frame format comprising some fifty-four bits of digital information may occur, for example, approximately every twenty-two milliseconds based on a 2400 bit per second digital data rate. Accordingly, the continuous selection and interruption process initiated by the conferencer will not be noticed by the participating conferees inasmuch as the auditory senses tend to integrate through such interruptions and the resultant voice communications appear to maintain a flow of coherent vocal communications. The first sequence 20 of operation of the conferencer involves the alignment of the frames of the data from each of the terminals 12–18. The second sequence 22 applies an Active Speaker Rule, described hereinafter, which determines which terminals have speaking conferees on the frame being processed. The third sequence 24 applies a Priority Assignment Rule, described hereinafter, which decides from among all active speakers who is to be the primary speaker and who is to be the interrupter. The fourth sequence 26 distributes to the appropriate terminals the data frame of either the primary speaker, interrupter, or idle sequence and causes this information to pass to the appropriate terminals.

Many variations of active speaker and priority rules are capable of being implemented within the present invention. An active speaker is defined as a conferee who is actually speaking as opposed to being silent. In practice, this distinction may often easily be made by utilizing the fact that a predetermined digital sequence within a frame format may be used to indicate speaker silence. For example, the frame format comprised of all "0" bits except for a single "1" bit in a predetermined bit space may result when the conferee is silent. This is to be contrasted with an irregular arrangement of "1"s and "0"s in a frame format indicating digitally encoded voice information from a speaking conferee. Priority assignment rules may be made, for example, either by physical connector location, manually directed operator controls inputted into the conferencer by means of selector switches, or by firmware processing. The primary speaker, for example, is often the first active channel conferee to speak and the interrupter, for example, is often the next sequentially active speaker after the primary speaker.

The operational sequences of the conferencer shown in FIG. 2 utilize various combinations of hardware and firmware implementation within the conferencer structure. Sequence 20 primarily involves a hardware implementation for frame alignment. Sequence 22 primarily utilizes a firmware approach for recognition of the frame format patterns which denote an active speaker as opposed to an idle or interrupter sequence. Sequence 24, in applying priority assignments, may essentially be a hardware approach if, for example, it is accomplished by physical connector location or by manual switch selection or, alternatively, a firmware approach may be implemented in which case the conferencer itself may assign priorities and which priorities may change dynamically from frame to frame. Sequence 26 calls for the distribution of particular frame information to the appropriate terminals which involves both firmware and hardware implementation in the distribution selection process and the transmission of the information to the terminals.

Figure 3:
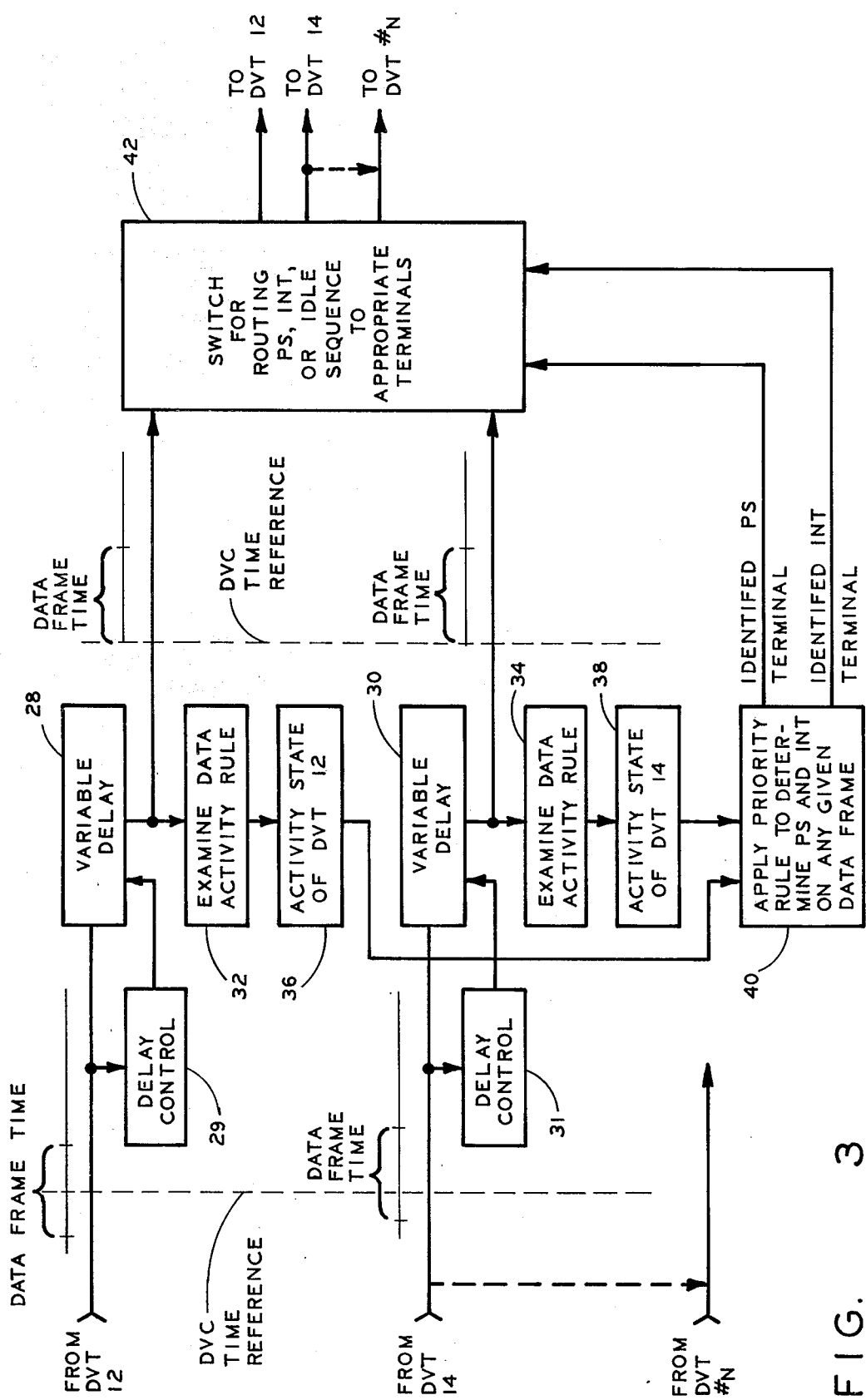
FIG. 3 is a block diagram of the functions performed by the conferencer of the present invention.

FIG. 3 illustrates a block diagram of the functions performed by the conferencer of the present invention. The frame of digital sequences from each digital voice terminal as generated from outputs of terminals 12 and 14 enters its corresponding variable delay 28 and 30. Parallel with the input lines to the delays 28 and 30 are indicated non-aligned data frame time boundaries from the individual terminals and which frame boundaries occur at different times relative to the DVC time references indicated as vertical reference lines. The variable delays 28 and 30 accept the contents of the unaligned frames which are written into and buffered within the variable delays. By means of delay controls 29, 31, a time delay of a specific amount is introduced between the time a frame of terminal data is written into the delay and the time this same frame is transferred to the conferencing processing circuitry. Frame alignment delay controls 29, 31 are associated with a given terminal to determine what its delay must be, so that when the terminal signal emerges from the delay, its frame boundary will be concurrent with the DVC time reference. Since the DVC time reference is identical for all delay control and processing circuits, all frame boundaries will be commonly aligned when they emerge from their respective variable delays.

The data frame input signal is connected to respective associated examination and processing circuits which apply an activity rule to the aligned data frame. This rule is applied to the data frame received from terminal 12 by circuit 32 and, similarly, to the data frame received from terminal 14 by circuit 34. The activity rule determines whether a given digital voice terminal speaker is active as earlier defined. The actual examination of the data frame information is accomplished by conventional examination and decoding techniques well-known to those skilled in the art. After application of the activity rule by circuits 32 and 34 to the respective data frame information, the speaker activity state of the respective terminal is duly noted by circuits 36 and 38. This is simply an active or non-active condition for each of the voice information frames which has been received within the data frame time. The outputs from the respective activity state circuits 36, 38 form inputs to a circuit 40 which applies the priority rule to decide who is the primary speaker and interrupter on any given output data frame. The circuit 40 identifies both the primary speaker (PS) terminal and the interrupter speaker (INT) terminal from among the active speakers and provides such outputs to the inputs of a switch 42. The switch 42, in combination with the aligned data frame outputs from respective variable delays associated with appropriate terminals, switches the identified primary speaker and interrupter data sequences from the corresponding two appropriate digital voice terminal inputs for return to appropriate terminals. The figure illustrates inputs from terminals 12, 14 and N to illustrate the conferencer capabilities in handling more than two terminals. The number of outputs from the switch 42 will correspond in number to the terminals within the conferencing system, and it is to be noted that on every output there will appear either the data sequence of the PS or that of the INT.

FIG. 4 illustrates a simplified block diagram of the major components of the conferencer and data flow therebetween according to the present invention. Channel buffer cards 44, 46 and 48 receive and transmit data between the respective digital voice terminals and a system microprocessor and memory 50. In the illustrated embodiment, buffer card 44 processes signals from DVT 12 and buffer card 46 processes signals from DVT 14. Buffer card 48, being representative of the Nth buffer card in an arbitrarily large conferencing system, is connected to process signals from digital voice terminal N. Each of the buffer cards is connected to receive address data from the microprocessor 50 by means of an address bus interconnecting the microprocessor 50 and respective digitized voice inputs to the associated cards. Additionally, each of the buffer cards processes bidirectional data between themselves and the microprocessor 50 by means of an interconnecting data bus. A timing card 52 is connected to receive bidirectional data from the microprocessor and memory 50 by means of connection to the data bus and also receives address data from the microprocessor 50 by means of an address bus connection. The timing card 52 provides a serial data bus output signal which is commonly connected to respective inputs of the channel buffer cards 44, 46, 48 and also provides a synchronous frame time signal (SFT) to the microprocessor 50. The channel buffer cards incorporate the circuits used to implement the variable delays referred to in FIG. 3. Also included on the buffer cards is the circuitry which sends the voice data signal, i.e. the primary speaker, interrupter or idle sequence back to the digital voice terminals. The timing reference signals required to do the frame alignment process are provided to each channel buffer card by the timing card 52. The resulting aligned frames from each digital voice terminal are sent to the microprocessor memory 50 from the channel buffer card via the microprocessor data bus. Once in memory, these frames of digital sequences are examined by the activity and priority rules which are optionally implemented by microprocessor firmware. Subsequently, the conferencing process determines which of the digital sequences from the various voice terminals stored in memory should be primary speaker or interrupter. Under the control of the microprocessor, the two frames representing primary speaker and interrupter are taken out of memory and routed to the appropriate channel buffer cards. From the buffer cards, the data is then sent to the respective voice terminals.

Before describing the preferred embodiments of the channel buffer card and timing card hardware, it will be helpful to keep in mind the fundamental principle by which the present invention achieves conferencing of a set of digital signals. In particular and on a periodic basis, the microprocessor collects a set of input bits from the digital voice terminal transmitters of each of the conferees. During a given period, referred to as the synchronous frame time (SFT), a firmware algorithm examines all the individual sets of data bits and one set is selected as being the primary speaker. This set is sent out to the digital voice terminal receivers of all conferees except that of the primary speaker. The set sent back to the primary speaker is determined by the same algorithm operating on all sets except that of the primary speaker. The set selected to be sent back to the primary speaker is known as the interrupter. The duration of SFT is fixed by the firmware instructions being executed and is nominally the same time duration as a single data frame of the voice digitizer being conferenced.

Figure 5:
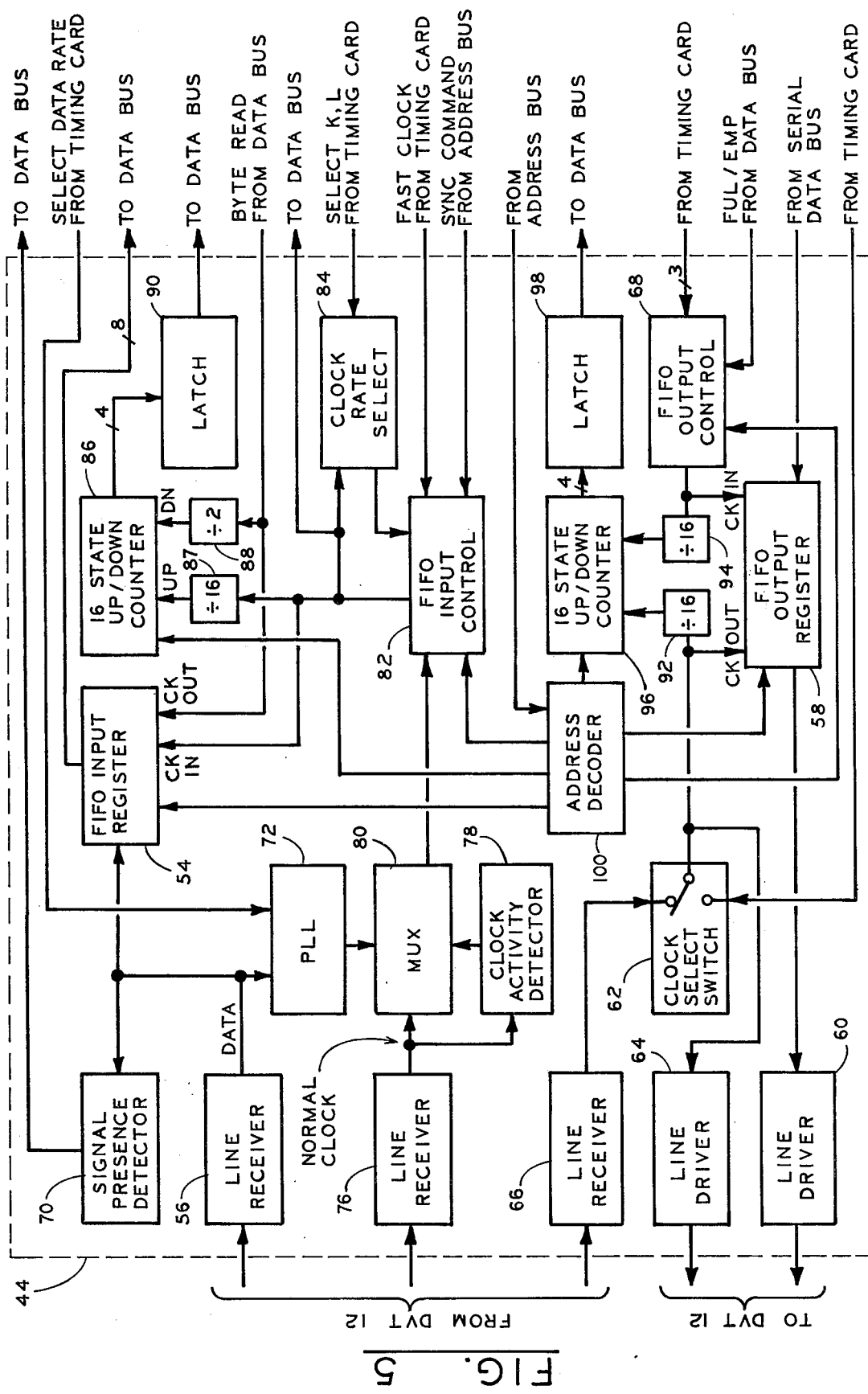
FIG. 5 is a block diagram of channel buffer card circuitry as used in accordance with the present invention.

Referring now to FIG. 5, there is shown a block diagram of the circuitry within the respective channel buffer cards. As a starting point, the voice channel hardware of the buffer card can be considered as two first-in, first-out (FIFO) data registers. Each of the registers has a storage capability of thirty-two 8-bit bytes. The FIFO input register 54 accepts data via a line receiver 56 from an output of the digital voice terminal 12. The data is accepted by FIFO register 54 at a rate synchronous with the transmitter of the terminal 12 and puts out data to the microprocessor memory 50 via the data bus under control of timing signals determined by the microprocessor instruction sequence. The output data rate from FIFO register 54 is determined by the receiver requirements of the voice terminal.

For framed voice digitizers an initial synchronization process is performed wherein data are stacked up in the FIFO input register 54 in such a fashion that the set of bits put out to the microprocessor memory during any synchronous frame time are all from the same frame of the voice terminal digitizer. In the case of a model HY-2 voice terminal, for example, a frame is 54 bits in length. When power is applied to the conferencer of the present invention, the firmware goes through the synchronization operation for each user voice terminal.

As noted hereinbefore, the SFT is a timing signal developed on the timing card and whose time duration is nominally that of one frame of the digital voice terminal being conferenced. Since all of the terminals as well as the processor may be running asynchronously, the duration of SFT will generally be slightly different than a frame of the digitized voice signal. In order to keep the input FIFO register 54 from over or underflowing (which would destroy synchronization), the microprocessor monitors the "fullness" of the input FIFO register 54. When the microprocessor senses that the register is getting too full, i.e. more than half full, the microprocessor causes two complete frames to be read out of the register during one SFT. Similarly, if the register is getting too empty, i.e. less than half full, no data will be read out during one SFT. During those occasional synchronous frame times when the microprocessor fails to read a frame of data from the FIFO input register 54, the software conferencing algorithm utilizes the previous frame of data provided by that conferee. Since consecutive frames of data read out of the FIFO register 54 overlay the same area of microprocessor memory, failure to read a frame of data from the FIFO input register 54 automatically leaves the previous frame in the microprocessor memory. Conversely, when two frames are read out in a single SFT, the first one which is read is automatically thrown away. The result of this operation is occasional duplication of an entire frame of data at the digital voice terminal receiver. However, unless the terminal and the conferencer clocks differ considerably, i.e. by several percent, no degradation in conferencing capability is noted.

Data is clocked out of a FIFO output register 58 to the voice terminal 12 through a line driver 60. The data can be clocked out in two modes by means of a clock select switch 62 through a line driver 64. In the first mode, data can be clocked out with a clock signal provided by the voice terminal as received via a line receiver 66, or in a second mode data can be provided to the terminal receiver along with a clock which is synchronous with the conferencer internal timing as received from the timing card. In the second mode, exactly one frame of data is clocked out each SFT and, as a result, the FIFO output register 58 will never over or underflow. In the first mode, provision is made for avoiding over or underflow by having the microprocessor monitor the fullness of the output register. More specifically, in each SFT, the microprocessor, via the timing card, sends four burst frames of K bits of data described hereinafter with respect to FIG. 7, waveform C. The four burst frames of sent data are, respectively: (1) the frame of interrupter data destined for the receiving terminal of the conferee who is the primary speaker on that SFT, (2) the repeat of (1), (3) the frame of primary speaker data destined for all receiving terminals except that of the primary speaker, and (4) the repeat of (3).

Under microprocessor control on each SFT, a given FIFO output control 68 accepts either zero, one, or two frames worth of either interrupter or primary speaker data. In this fashion, overflow or underflow of the output FIFO register 58 is avoided and in addition, interrupter and primary speaker data are routed to the appropriate receiver terminals.

Referring again to the block diagram of FIG. 5, data as received by the line receiver 56 is commonly applied to respective inputs of the input register 54, signal presence detector 70, and a phase lock loop (PLL) 72. The signal presence detector 70 is a retriggerable single shot with a time-out of 250 milliseconds and which is fired by positive transitions on the received data line. The status of the detector 70 is placed on a predetermined bit of the microprocessor data bus and is, therefore, monitored by the microprocessor 50. In this fashion, the microprocessor 50 keeps an up-to-date list of electrically active channels and performs the conferencing algorithm only among electrically active channels. If, for some reason, a received data line hangs up as, for example, by receiving a continuous stream of logic "1"s, the microprocessor 50 will soon dismiss it from the list. Without this feature, the received data line of a single conferee which failed in this fashion could destroy the entire conference. The PLL 72 provides a means of regenerating an input data clock when none is provided by the terminal. The PLL is capable of operating at any one of a number of preselected input data rates such as, for example, 2.4, 3.6, 4.8, 9.6, 16 and 32 kilobits per second as selected from switches on the timing card. As discussed herein, the terms kilobits per second and kilohertz are used interchangeably to denote various clock and data rates.

When a clock signal (Normal Clock) is available from a digital voice terminal, the clock signal will be received by a line receiver 76 whose output is commonly connected to respective inputs of a clock activity detector 78 and a MUX (multiplexer) 80. Detection of the presence of a normal clock signal by the detector 78 automatically causes the normal clock to be selected for clocking data into the FIFO input register 54. Similarly, absence of activity on the normal clock line automatically results in selection of a regenerated clock as provided by the output of the PLL 72 to an input of the MUX 80. The detector 78 operates such that whenever the input clock line goes to a logic "1" level, the detector 78 determines if it remains a logic "1" for at least 13 microseconds, i.e. slightly less than half a period of the highest rate clock, 32 kilohertz, with which the conferencer of the preferred embodiment is designed to operate. If the clock line remains at a logic "1" level for at least 13 microseconds, a re-triggerable single shot within the detector 78 with a time-out in excess of 417 microseconds is fired. This time period corresponds to one period of the lowest rate clock, 2400 hertz, with which the preferred embodiment of the conferencer is designed to operate. As long as the single shot in the detector 78 remains fired, the detector 78 provides an output signal to the MUX 80 in order to cause the received normal clock to be transmitted to the output of the MUX and into the input clock of the FIFO input register 54 via FIFO input control 82.

In order to understand how data is clocked into the input FIFO register 54, it is important to keep in mind that the microprocessor 50 wants to process user data as 8-bit bytes. For this reason, data is clocked into the register 54 serially and out of the register 54 in parallel 8-bit byte format. To simplify software bookkeeping, the input data to the register 54 is arranged so that a frame of data always consists of an integer number of bytes. This frame arrangement is best described with an example. A frame of data as received from a digital voice terminal such as a modely HY-2, for example, is fifty-four bits in length. The fifty-four bits are serially clocked into the input register 54 by means of a clock signal as provided by the MUX 80 via the FIFO input control 82 to the register 54. The fifty-fourth bit is then clocked into the register 54 and repeated as many times as is necessary to complete an 8-bit byte. In this example, two additional repeats of the fifty-fourth bit complete the seventh byte. Repeated data are clocked into the input register 54 by means of a fast clock signal provided to an input of the FIFO input control 82. Selection of the normal clock as provided from the MUX 80 or the fast clock provided by the timing card is accomplished by a clock rate select 84 circuit having an input connected to receive switch selectable parameters from the timing card and an output provided to an input of the FIFO control 82. The number of cycles (K) of the normal clock signal and the number of cycles (L) of the fast clock signal required to carry out this operation is a function of the particular voice digitizing terminal and is selected by means of the switches on the timing card. The integer $M=((L+K)/8)$ is the number of bytes that the microprocessor 50 must read from the FIFO input register 54 on any SFT in order to transfer one complete frame of user data to the microprocessor memory 50.

As earlier noted, an initial synchronization process is performed for each FIFO input register whose data activity detector indicates the presence of an input signal. Upon completion of the firmware controlled synchronization algorithm, data are stacked in the input FIFO register in such a fashion that the M bytes read from the FIFO input register in any SFT will contain data from only a single voice terminal frame. Furthermore, the last $(L+1)$ bits of the Mth byte, i.e. the last bit in the frame and its L repeats, are all identical.

The details of the firmware synchronization algorithm will be explained hereinafter. The algorithm examines the initial stacking pattern by locating the position of the frame sync bit within the unsynchronized frame of data and decides how many bits of user data must be inhibited from entering the input FIFO register to achieve the desired stacking arrangement. The microprocessor 50 then issues a sync command to the input FIFO control 82. Each issuance of this command causes a single bit to be slipped (deleted) from the FIFO input register 54. At any arbitrary time after issuing the bit slip instruction, the microprocessor 50 can interrogate the hardware to determine if it is ready to slip another bit. A firmware counter makes sure that the bit slip instruction is issued the appropriate number of times to achieve synchronization.

As earlier noted, data are clocked serially into the FIFO input register 54 and out onto the microprocessor 50 data bus in a parallel 8-bit byte format. The register 54 will hold thirty-two bytes and at any time the number of byte pairs presently in the register 54 is indicated by the state of a sixteen-state up/down counter 86. The counter 86 is caused by a divide-by-sixteen circuit 87 to count up by one for every sixteen input bits (two input bytes). The counter 86 is caused to count down by one for every pair of byte-read instructions provided by the data bus to the common input connection of the FIFO 54 output clock, and a divide-by-two circuit 88; the output of the divide-by-two circuit 88 is connected to the down control imput of the sixteen-state counter 86. The input register 54 is cleared upon power-up of the conferencer in any conventional well-known manner such as providing an appropriate signal to the clear input (not shown) of the register 54. Thereafter, the state of the counter 86 is placed in the microprocessor 50 data bus by means of an output signal to a latch 90. In this fashion, the microprocessor 50 determines the necessary action, e.g. read zero, M or 2M bytes on an SFT, to maintain the backlog of data frames in the input register 54 at its proper "half-full" level, i.e. eight byte pairs. The FIFO input clock as produced at the output of the FIFO input control 82 is sent to the microprocessor data bus for monitoring. By monitoring this clock signal, the microprocessor 50 ensures that the FIFO input register clear command will be executed only when the clock signal is low and, additionally, the microprocessor can interpret as a fault condition the situation wherein the absence of input clock activity occurs when the signal presence detector 70 indicates an electrically active channel.

In contrast to the operation of the FIFO input register 54, the FIFO output register 58 clocks data both in and out of the device in serial fashion. Similar to the input register 54, the output register 58 will hold thirty-two 8-bit bytes. Since both input and output clocking is done in the output register 58 in serial fashion, the respective output clock signal as provided by the output of clock select switch 62, and the input clock signal as provided by the output of FIFO control 68 are each inputted to respective divide-by-sixteen circuits 92, 94. The circuits 92, 94 operate on the respective input and output clock signals to cause a sixteen-state up/down counter 96 to indicate the number of byte pairs in the output FIFO register 58 and which permits monitoring of the fullness of the register so that the microprocessor can maintain the desired half-full status. The state of the up/down counter 96 is transmitted to the microprocessor data bus by means of an output from a latch 98. Monitoring of the FIFO fullness status as provided by the output of latch 98 is necessary in the situation wherein data are clocked out of the FIFO output register 58 at a rate specified by the user receiving terminal. From the FIFO status, the microprocessor 50 generates either an empty (EMP) or a full (FUL) signal on the input line labeled "FUL/EMP" connected to FIFO output control 68. Depending on the status of the empty or full signals, the FIFO output control 68 passes either zero, one or two compressed frames' worth of input clock edges to the FIFO output register 58. Two frames of data are clocked into the register 58 when EMP=0 and FUL=0, while FUL=1 results in no frame being clocked into the register 68. The FIFO output control 68 is connected to receive three timing signal inputs from the timing card 52 as shown in FIG. 4. The three timing signals are representative of a burst-clock signal, a repeat signal and a primary speaker signal.

An address decoder 100 is connected to receive an encoded address signal from the microprocessor address bus and provides a plurality of outputs, respective ones of which are connected to the input FIFO control 82; the FIFO input register 54; the sixteen-state up/down counters 86, 96; the output FIFO register 58; and the output FIFO control 68 so as to selectively address and activate the respective circuitry upon the particular address signal being received from the address bus under the control of the microprocessor 50.

Referring now to FIG. 6, there is shown a block diagram of the circuitry within the timing card 52 earlier noted in FIG. 4. The timing card circuitry performs a variety of special tasks in addition to the development of timing signals. Three of the special tasks performed which are described hereinafter are: (1) reformat conference data from the microprocessor 50 to the individual channel output FIFO's and provide data clocking signals, (2) provide special purpose timing signals to the channel buffer card circuitry, and (3) interface operational parameters set up on switches located on the timing card to the microprocessor 50.

Data destined for each output FIFO such as register 58 shown in FIG. 5 are read from the microprocessor data bus in byte (8-bit parallel) format. A single frame of output data will always consist of an integer number of bytes because of the process of repeating the last bit at the input FIFO register. These repeats of the final bit must be removed before the data are clocked into the output FIFO's. In order that the hardware which accomplishes this removal will not have to be duplicated on each individual channel buffer card, the hardware is implemented only once on the timing card and the properly formated data signal is bussed to all the channel buffer cards. Included in this reformatting is a byte-to-serial conversion of the data. This byte-to-serial conversion as well as the process of removing the repeated bit is accomplished by a parallel-to-serial converter 102 which is connected to receive the parallel data from the microprocessor data bus and provides a serial output to the serial data bus. The converter 102 is an 8-bit register into which the eight bits of each byte from the data bus are clocked in parallel. Every byte to be transferred is clocked into the converter 102 by means of an output signal initiated by an address decoder 104 having an input connected to receive signals from the microprocessor address bus. Data are serially clocked out of the converter 102 with a clock signal provided by a timing signal generator and control circuit 106. The burst-clock output signal as well as other specialized output signals generated within the timing signal generator and control circuit 106 are explained with greater detail hereinafter with reference to FIG. 7. A master oscillator 108 provides a master clock signal output to an input of the timing signal generator and control circuit 106 and which further processes the master clock signal into a variety of output signals including the synchronous frame time signal, the fast clock signal, the repeat signal, the primary speaker signal (PSPK) and the burst-clock signal. In the preferred embodiment, the master oscillator 108 has a frequency of 2.304 megahertz. The circuit 106 divides down the master oscillator frequency to provide a 576 KHz. rate for the fast clock signal output. The address decoder 104 also provides enabling signals to the circuit 106 and to a manual system parameter control circuit 110 in order to activate the respective circuitry in accordance with signals received from the address bus.

The manual system parameter control 110 is implemented on the timing card by a series of switches which modify various parameters in the hardware and firmware instructions. As part of the initialization algorithm, the status of these switches is read at power turn-on. Functionally, the manual system parameter control 110 selects the data rate, the number of extra bits per frame (L), the number of bits per frame (K), the structured or unstructured mode, and the no interrupt mode.

Figure 7:
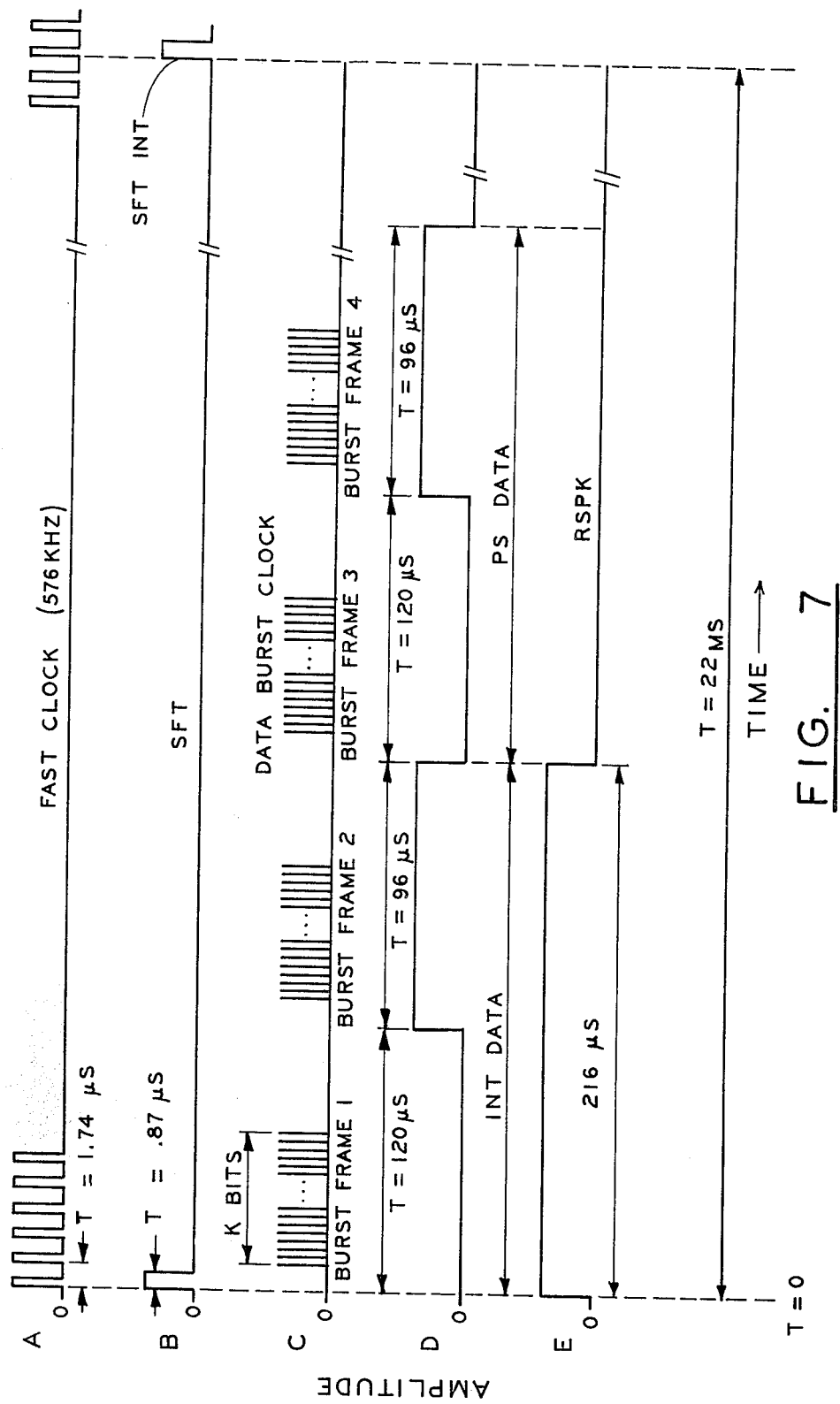
FIG. 7 illustrates selected signal waveforms as generated in accordance with the operation of the present invention.

Referring now to FIG. 7, there is shown a plurality of timing diagram waveforms as generated within the preferred embodiment of the invention. Waveform A illustrates the fast-clock signal having a frequency of 576 KHz. Waveform B illustrates the synchronous frame time signal having a time period nominally equal to the duration of the number of bits per frame (K) of the associated digital voice terminal. For example, in the case when the voice terminal is an HY-2, the duration of SFT is approximately 22 ms. Waveform C illustrates the generation of the data burst-clock signal which is designed to generate a series of four bursts of the fast-clock signal, each of the four bursts having K fast clock pulses per burst. Waveform D illustrates the repeat timing signal having a pair of alternating positive-going pulses which are time-coincident with the generation of burst frames 2 and 4 as shown in Waveform C. Waveform E illustrates the primary speaker timing signal (PSPK) having a positive level for a time duration equal to two burst frames of fast-clock signals (approximately 216 $\mu$sec.) as shown in Waveform C. The pulse changes to a zero-level during the occurrence of the remaining two bursts of fast clock shown in Waveform C. The pulse in Waveform E occurs for a time period indicative of the period during which interrupter data is provided to the primary speaker and, for the remaining waveform time when the pulse returns to zero-level, the primary speaker data is transmitted to non-primary speaker channels.

As earlier noted, the hardware implementation of the preferred embodiment described hereinbefore involves considerable interaction with circuitry and firmware contained within the microprocessor and memory 50 shown in FIG. 4. The firmware residing in the read-only memories associated with the microprocessor 50 provides the means by which the hardware is controlled to provide the data synchronization and real-time conferencing of the digital voice terminal sequences as such sequences are transferred among the conferencer and a plurality of the terminals. In the preferred embodiment, an Intel 8080 microprocessor is used in conjunction with associated conventional programmable read-only memories (PROM).

The firmware algorithms used within the present invention basically fall into two categories depending upon the type of digital voice terminal being conferenced, namely a framed terminal such as the HY-2 or an unframed terminal such as a CVSD. With respect to the framed type of terminal, the fact that different predetermined frame lengths are utilized by different terminals is accommodated in the hardware by means of the manual system parameter controls 110 shown in the timing card circuitry 52 of FIG. 6.

The framed firmware algorithms fall into two general categories. The first general category are those which must be completed once per synchronous frame time (SFT). The second category are less critical to the real time nature of the conferencing and have no specific constraint on the amount of time in which they must be completed. These latter algorithms can therefore be performed with whatever time is left over within an SFT after completing algorithms of the first category. The two categories of algorithm processing are referred to as foreground and background, respectively. The firmware "modules" performed in each of these modes are shown with reference to FIG. 8 which illustrates a top-level flow chart for accomplishing foreground and background processing.

Figure 8:
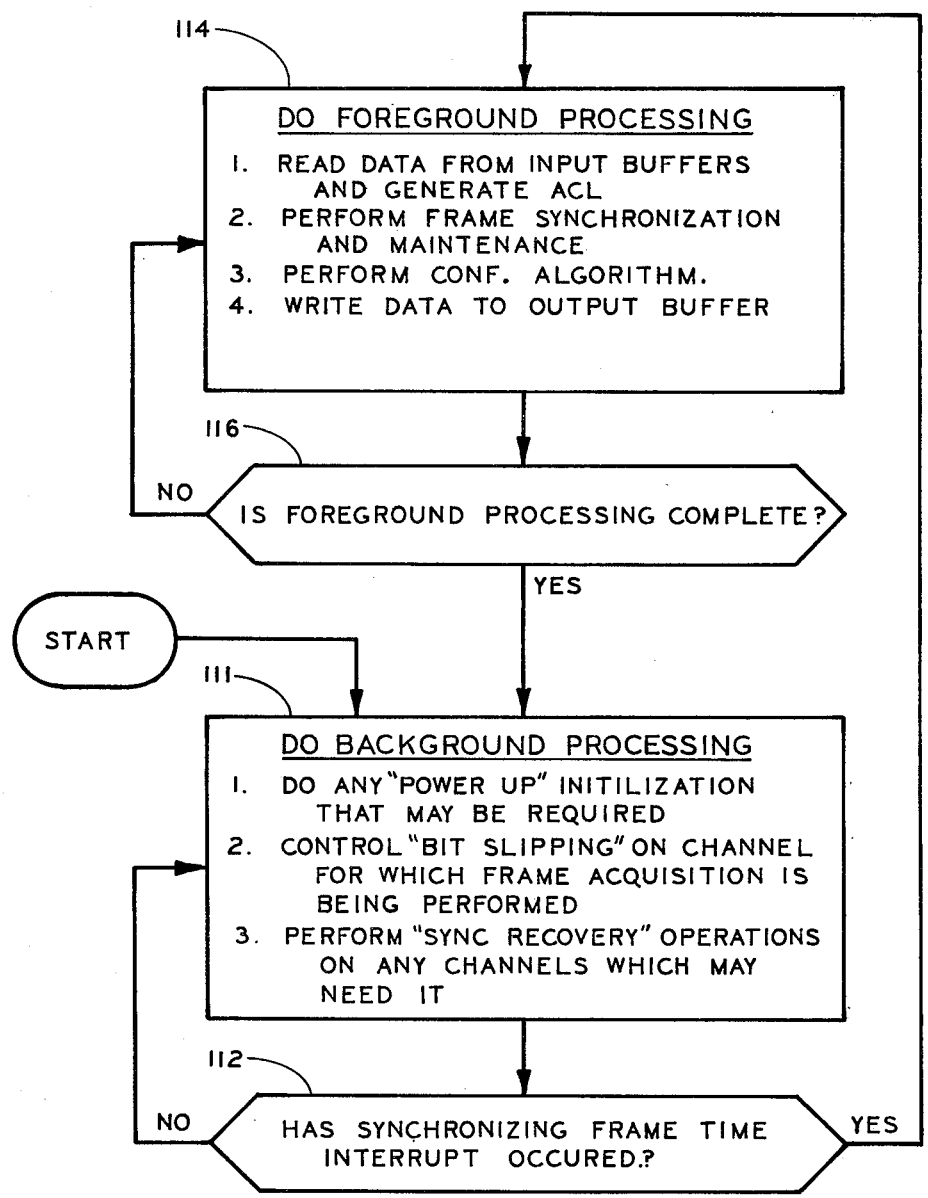
FIG. 8 is a top level flow chart illustrating data processing steps as used with framed digitizers in accordance with the present invention.

Referring now to FIG. 8, the flow chart instructions are initiated with background processing steps as set forth in instruction block 111. As indicated, the background processing involves three major steps. Step 1 requires that any power-up initialization be performed wherein, for example, counters and registers within the hardware are cleared as well as switch settings checked for consistency. Step 2 requires the control of the hardware bit slipping process by which frame synchronization and alignment on each channel is accomplished. In effect, this firmware step takes care of the handshaking with the hardware to see that bit slipping is properly carried out. In particular, the firmware sequentially cycles through the list of operating channels issuing a bit-slip command to each channel which requires it. Step 3 requires the performance of sync recovery operations on any channels which are in an unsynchronized mode. In particular, this operation clears the FIFO input and output registers for a particular channel and then attempts to sequence through the steps necessary to get the FIFO registers to a point, i.e. half-full, wherein sync acquisition can be performed. After background processing, a decision level is reached as shown by instruction block 112 wherein it is asked whether or not Synchronous Frame Time interrupt has occurred. As earlier noted in FIG. 7 Waveform B, the SFT interrupt occurs at the positive going edge of the SFT signal. If not, the background processing steps are once again repeated until such time as the SFT interrupt has occurred and the foreground processing as set forth in instruction block 114 is begun. The foreground processing involves four major steps. Step 1 requires the reading of data from the input buffers as implemented by the FIFO input registers on the channel buffer cards. This step causes an individual input FIFO to be read, i.e. written to memory. The reading operation is done zero, one or two times depending upon how full the FIFO is at read time. Assuming that at least one frame of data is read, a synchronization operation is then performed if the channel is not in the sync tracking mode. Each of the various framed type of digital voice terminals produces encoded digital data among which is contained in preselected bit positions information indicative of activity by the respective voice terminal. The channel information read from the respective individual input FIFO is checked for activity by a firmware algorithm. Active channels are put on an active channel list (ACL) within the microprocessor memory and such list is later used by a conference algorithm explained hereinafter. The status of the fullness of the channel output FIFO is also examined. The result of this examination is later used at the end of the conferencing algorithm to control whether zero, one or two framed transfers of the K bits composing a frame of voice data will be accepted by the FIFO output register to keep it properly full. Step 2 of the foreground processing requires the performance of frame acquisition and maintenance. At any given time, a single data channel can be in any one of a plurality of modes of channel synchronization. The mode for any given channel is determined by the current state of a counter contained within the microprocessor 50. In the case of the HY-2, for example, the sync acquisition mode causes a search over eight consecutive frames of digitizer data to learn where the sync bit is located. On the first of the eight frames, the search locates the first byte (in the seven-byte frame) to contain a logic 1. The location of the byte within the seven-byte frame is referred to as the "sync byte offset" and the 8-bit contents of the byte itself are referred to as the sync mask. On each of the next seven frames, the sync mask is updated by performing a logic "AND" operation between the existing sync mask and the bite in position "sync bite offset" on that frame. If the eighth frame is reached, and if there is still a surviving logic 1 in the sync mask, this logic 1 is assumed to be the bonafide sync bit. From the location of the bit within the mask, and the value of sync byte offset, the number of bits that must be slipped to achieve synchronization is computed. A bit-slip command is then issued by the firmware and during this slipping time the synchronization mode is referred to as "sync not ready". Once "sync not ready" has been completed, it will take a while (not more than five SFT times) for the first frame of correctly synchronized data to propagate through the input FIFO. This is referred to as "sync ripple time". Upon completion of sync ripple, the microprocessor enters the "sync track mode" wherein the channel is synchronized. Step 3 of the foreground processing performs the conferencing algorithm which is shown in greater detail in a lower-level flow-chart diagram as noted in FIG. 9.

Figure 9:
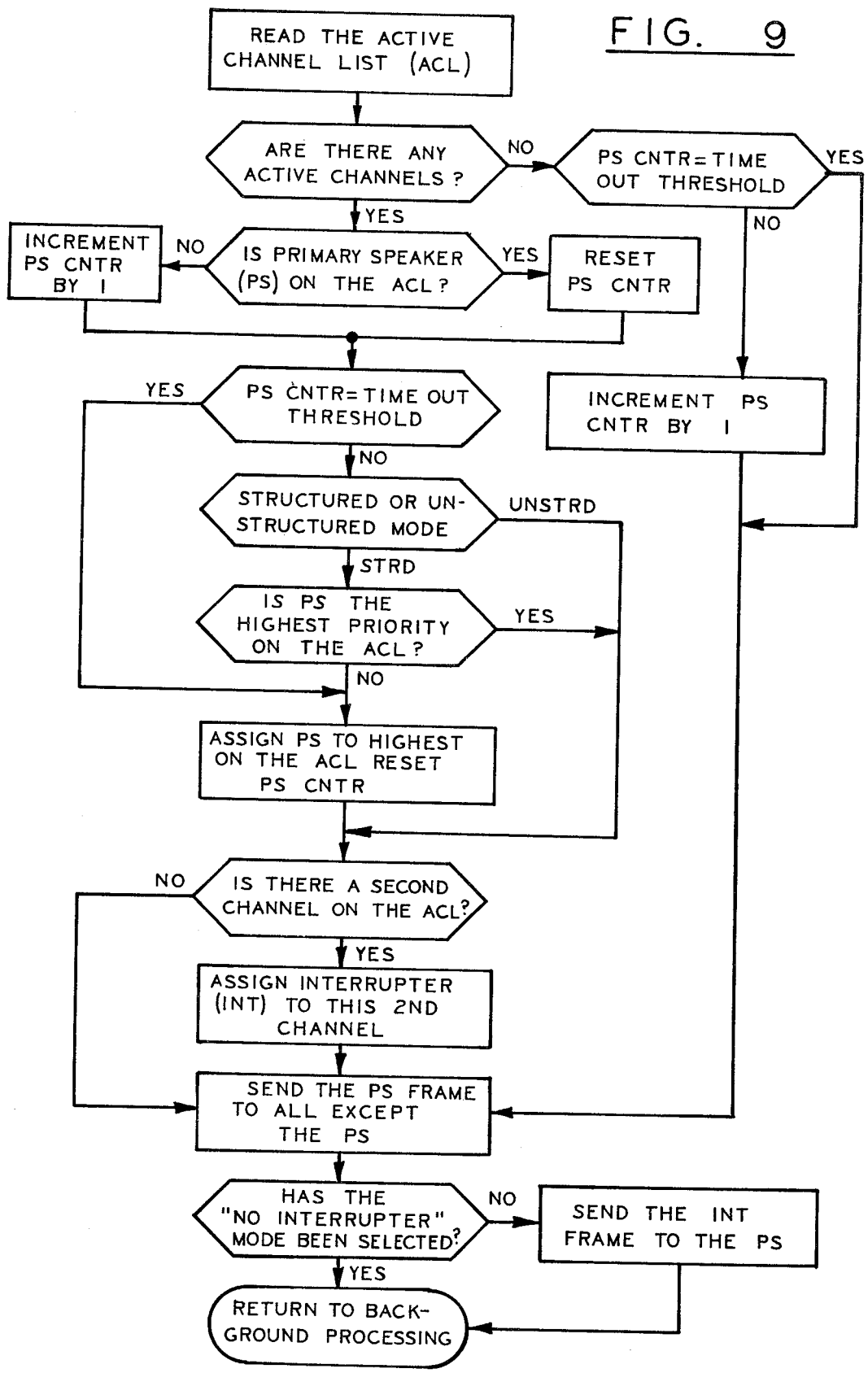
FIG. 9 is a flow chart of the conferencing algorithm as used in accordance with the present invention.

In particular, and with reference specifically to FIG. 9, the conferencing process selects one conferee as primary speaker (PS) and a second conferee as interrupter (INT). Once a conferee is selected as PS, how long that conferee holds that role depends upon whether the operator has selected the structured (STRD) or unstructured (UNST) mode by switch selection in the manual controls on the timing card. In the unstructured mode, the primary speaker will unconditionally retain that role for a specified time-out, i.e. a switch-specified number of SFT times, following his last active frame of information. A firmware counter is used to keep track of this time-out. In the structured mode, however, any other active conferee of higher priority than the present primary speaker will immediately assume the role regardless of the state of the time-out of the previous primary speaker. Conferees of lower priority become primary speaker only by the normal method and cannot usurp it in this fashion from a higher-priority primary speaker. As earlier noted, the priority of a given conferee may be determined by the connector location into which the conferee is plugged or by simple sequential selection of active speakers.

The primary speaker data is sent to all other conferees except the primary speaker. What is returned to the primary speaker is an idle sequence (if there is no other active channel) or the interrupter. The interrupter on any frame is the highest priority non-primary speaker. If there is no time-out associated with the interrupter, it can change from one SFT to the next. Although it is not indicated in FIG. 9, the frame of primary speaker data as well as the frame of data returned to the primary speaker is put out twice to the microprocessor data bus. As earlier noted, output FIFOs may accept either zero, one or two frames of data as necessary to remain properly filled when an external transmit output clock is provided. Finally, it is noted that by means of appropriate switch selection found on the manual controls of the timing card, the operator may select a "no-interrupter" conferencing algorithm. If this mode is selected, the idle sequence is always returned to the primary speaker, i.e. there is no longer any such thing as an interrupter. In this case, if a conferee hears anyone else in the voice terminal headset, he knows that anything that he says will not be heard.

With the foregoing discussion as background, the flowchart of FIG. 9 will be clear from the inception wherein the active channel list (ACL) is read, the primary speaker and interrupter are subsequently assigned, and continuing to the ending step wherein a return is made to the background processing steps as shown in instruction block 111 of FIG. 8.

Step 4 of the foreground processing instruction block 114 shown in FIG. 8 requires that the conferencing algorithm processed data be written into the appropriate output buffers as implemented by the FIFO output registers on the channel buffer cards.

The previous firmware discussion has been made with reference to the use of the conferencer invention with framed digital voice terminals. The following firmware discussion relates to the use of the conferencer invention with unframed digital voice terminals. Accordingly, the background and foreground processing partitioning as illustrated in FIG. 8 does not directly apply for use with unframed voice terminals. For example, the frame synchronization operation required in Step 2 of the foreground processing and which requires considerable firmware, does not have to be done. Consequently there is no "sync recovery" mode nor is there any "bit slipping" required to achieve frame sync. As a result, foreground processing Step 2 and background processing Steps 2 and 3 are not needed.

Figure 10:
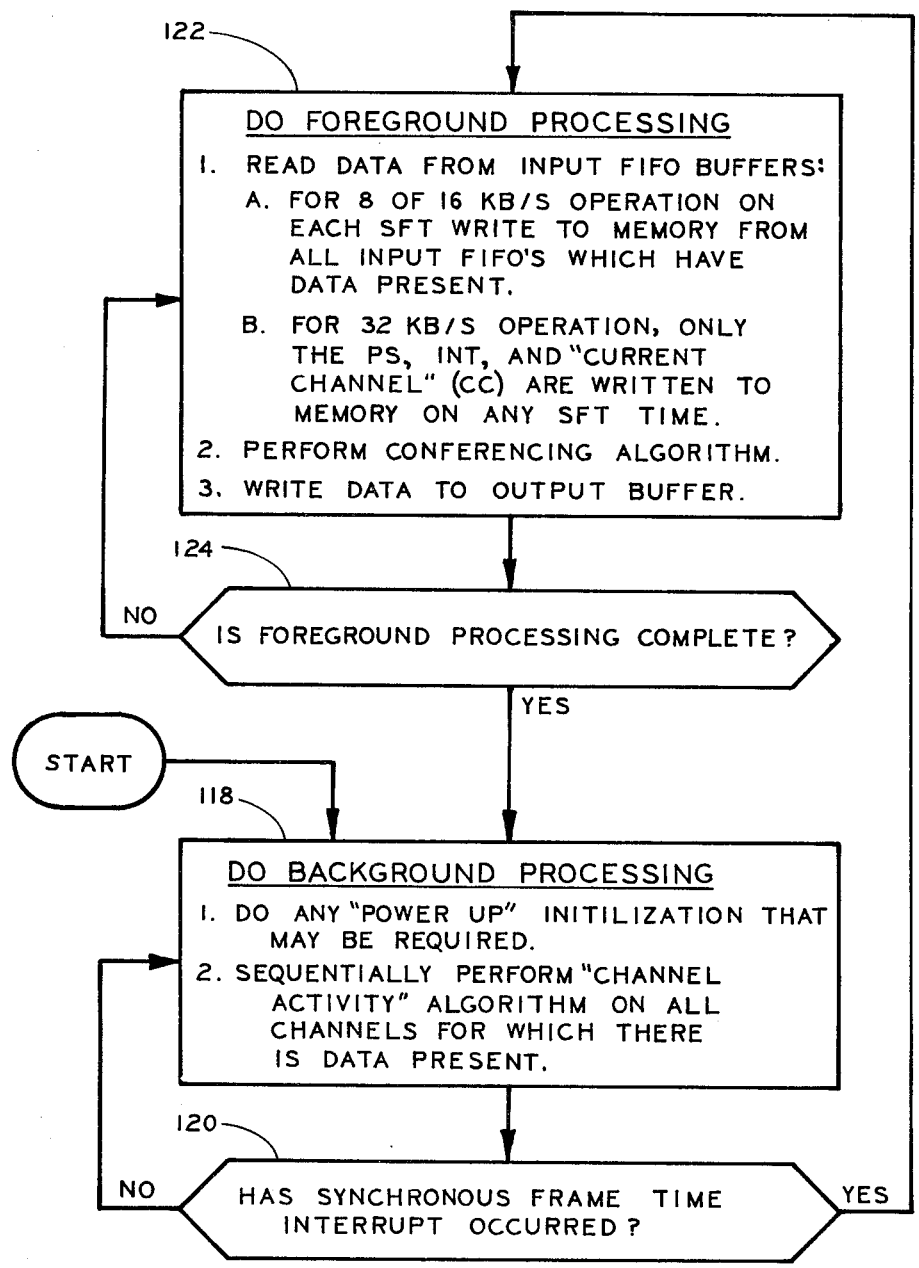
FIG. 10 is a top level flow chart illustrating data processing steps as used with unframed digitizers in accordance with the present invention.

FIG. 10 illustrates the background and foreground processing steps as utilized by the present invention when working in conjunction with unframed digital voice terminals. Before examining FIG. 10, it may be useful to consider the following points. For unframed systems, an SFT has been defined as 80 bit times (10 bytes). Consequently, an SFT is 2.5, 5 or 8.3 milliseconds for 32, 16 and 9.6 kilobits per second operation, respectively. For SFT times this short, the process which determines if a given channel is active is sufficiently time-consuming that it cannot be done for a large number of channels such as, for example, ten channels, within a single SFT time. Consequently, the process is relegated to the background mode until enough background processing time has accrued to determine channel activity on all channels (for which data is present) and the selection of primary speaker and interrupter mode by the conferencing algorithm will remain unchanged. It should be noted that with as many as ten channels having data present, any slowing down in the rate at which a new primary speaker and interrupter could be selected with this approach has no noticeable effect on the conferencing performance. At 32 kilobits per second operation, an additional step is required to reduce the amount of foreground processing. In particular, the 80 bits from each and every input FIFO register are not written into memory during each SFT. Instead, only those bits from the primary speaker, interrupter and "current channel" (CC) are written into memory and data from the remaining FIFO input registers are clocked out and ignored. From one SFT to the next the CC sequentially cycles through all channels which have data present. Hence, when the CC is either the primary speaker or interrupter, only two channels are written to memory, and three channels otherwise.

Referring now to FIG. 10, the background processing steps are given in instruction block 118 wherein, similar to the framed terminal utilization, Step 1 requires power-up initialization as explained hereinbefore. Step 2 requires the performance of a channel activity algorithm on all channels for which there is a data signal present. Eight consecutive bits of data for the channel being examined are stored in the microprocessor memory. The activity process examines these eight bits and determines the number of slope overloads present. It should be noted that when a delta modulator such as utilized within the typical digital voice terminal associated with the present invention is digitizing any waveform (other than a constant amplitude of "0"s), strings of bits having the same polarity, i.e. slope overloads, result. When a waveform of constant zero amplitude is being digitized, i.e. the speaker is not saying anything, the resulting digital data stream consists of alternating "1"s and "0"s known as the idle channel sequence. These two conditions are differentiated by assigning an "activity value" to each byte of data. This value is given by the number of pairwise bit agreements minus the number of bit transitions in the byte. Thus, if all eight bits in the byte have the same polarity (a high-slope overload condition) the activity value is +7, while eight bits of idle sequence would be −7. The actual activity value of any byte is determined by table look-up using the byte contents as the table address. The activity value is accumulated from byte to byte with the accumulation clamped at a value of 0 and 15. If the accumulation value is 7 or more after examining the eighth byte, that channel is declared as being active. The remainder of the conferencing process for unframed digital voice terminals as illustrated in FIG. 10 by reference to instructions blocks 120, 122 and 124 is identical to the one performed for framed digitizers as shown in FIG. 8. However, the active channel list is now updated in the background processing of instruction block 118 of FIG. 10 by the channel activity process just described.

Thus it may be seen that there has been provided a novel, digital voice conferencer which provides means of digitally synchronizing and processing digitally encoded vocal information among a plurality of digital voice terminal devices to enable accurate and high quality conferencing of audio information among such terminals.

Obviously, many modifications and variations of the invention are possible in light of the above teachings. It is therefore to be understood that within the scope of the appended claims, the invention may be practiced otherwise than as specifically described.

What is claimed is:

1. Apparatus for digitally conferencing a plurality of voice digitizer signals, each of the signals forming a series of bit sequences each having a predetermined number of bits and a uniquely positioned sync bit therein, each of the sequences being representative of encoded vocal information exchangeable among respective ones of a corresponding plurality of conferees, comprising:
    means adapted to receive the digitizer signals for detecting the sync bit, said sync bit being indicative of the beginning of the associated bit sequence;
    means connected to said detecting means for commonly aligning said bit sequences within one period of a repetitive time interval, each of said aligned bit sequences being associated with respective ones of the conferees; and
    means connected to receive said aligned bit sequences for predeterminedly selecting at least one of said bit sequences during each of said time intervals for distribution to selected remaining ones of the conferees for providing a conference.

2. Apparatus according to claim 1 wherein the means for selecting selects two of said bit sequences during each of said time intervals and includes first distribution means for periodically distributing during each of said time intervals one of said selected two sequences to the conferee associated with the other of said selected two sequences and second distribution means for periodically distributing during each of said time intervals the other of said selected two sequences to remaining ones of the conferees.

3. Apparatus according to claim 1 wherein the means for selecting further comprises:

means for sensing data activity among respective ones of said bit sequences for identifying actively speaking conferees; and means for predeterminedly selecting the said at least one of said bit sequences from the identified sequences associated with said actively speaking conferees.

4. Apparatus for digitally conferencing a plurality of voice digitizer signals, each of said signals forming a series of bit sequences each having a predetermined number of bits and a uniquely positioned sync bit therein, each of the series of bit sequences being representative of encoded vocal information exchangeable among respective ones of a corresponding plurality of conferees, comprising:

means adapted to receive the digitizer signals for detecting the sync bit within each of said bit sequences, said sync bit being indicative of the beginning of the associated bit sequence;

means connected to said detecting means for commonly aligning said bit sequences within one period of a repetitive time interval, each of said aligned bit sequences being associated with respective ones of the conferees;

means for sensing data activity among respective ones of said aligned bit sequences for identifying actively speaking conferees;

means for predeterminedly selecting at least one of the aligned bit sequences associated with an identified actively speaking conferee during each period of said repetitive time interval for distribution to selected remaining ones of the conferees; and means for periodically distributing during each of said time intervals the said at least one selected aligned sequence to said selected remaining ones of the conferees for providing a conference.

5. Apparatus according to claim 4 wherein the means for selecting selects two of said aligned bit sequences during each of said repetitive time intervals and includes first distribution means for periodically distributing during each of said time intervals one of said selected two sequences to the conferee associated with the other of said selected two sequences and second distribution means for periodically distributing during each of said time intervals the other of said selected two sequences to remaining ones of the conferees.

* * * * *